United States Patent [19]

Galuska

[11] 4,440,639

[45] Apr. 3, 1984

[54] UNIVERSAL MAGNETIC ANGLED STRAINER

[76] Inventor: Charles W. Galuska, Lilac City Estates, 5 Fuchia Dr., Rochester, N.H. 03867

[21] Appl. No.: 377,457

[22] Filed: May 12, 1982

[51] Int. Cl.³ .................. B01D 35/06; B03C 1/02
[52] U.S. Cl. .................................. 210/222; 55/3; 55/100; 210/120
[58] Field of Search ............... 210/222, 223, 521, 522, 210/532.1, 320, 120, 136, 117, 695, 801, 802; 55/462, 465, 3, 100

[56] References Cited

U.S. PATENT DOCUMENTS

| | | | |
|---|---|---|---|
| 643,237 | 5/1928 | Blume | 210/223 L |
| 2,464,628 | 3/1949 | Willard | 210/222 |
| 2,635,754 | 4/1953 | Stem | 210/223 |
| 2,699,871 | 1/1955 | Stem | 210/223.1 |
| 2,781,128 | 2/1957 | Stem | 209/223.1 |
| 3,886,064 | 5/1975 | Kosonen | 210/522 |
| 3,933,654 | 1/1976 | Middelbeek | 210/521 |
| 4,028,075 | 6/1977 | Roberge | 210/136 |
| 4,116,829 | 9/1978 | Clark et al. | 210/425 |
| 4,212,407 | 7/1980 | Lydon | 220/88 R |
| 4,229,296 | 10/1980 | Wheaton et al. | 210/120 |
| 4,244,822 | 1/1981 | Slavens | 210/222 |
| 4,265,755 | 5/1981 | Zimmerman | 210/222 |
| 4,299,700 | 11/1981 | Sanderson | 210/222 |
| 4,299,701 | 11/1981 | Garrett et al. | 210/222 |
| 4,306,970 | 12/1981 | Tanaka | 210/222 |

Primary Examiner—Charles N. Hart
Assistant Examiner—Wanda L. Millard
Attorney, Agent, or Firm—B. Kreten

[57] ABSTRACT

A device for separating magnetic particles from a fluid stream including an enclosure, an inlet and an outlet conduit communicating with the top portions of the enclosure, and a baffle interposed therebetween causing fluids passing from the inlet to the outlet to traverse to a lowermost portion of the enclosure, in proximate location to a magnetic source whereby the intimate contact thereon causes magnetic particles entrained in the fluid to be removed.

9 Claims, 1 Drawing Figure

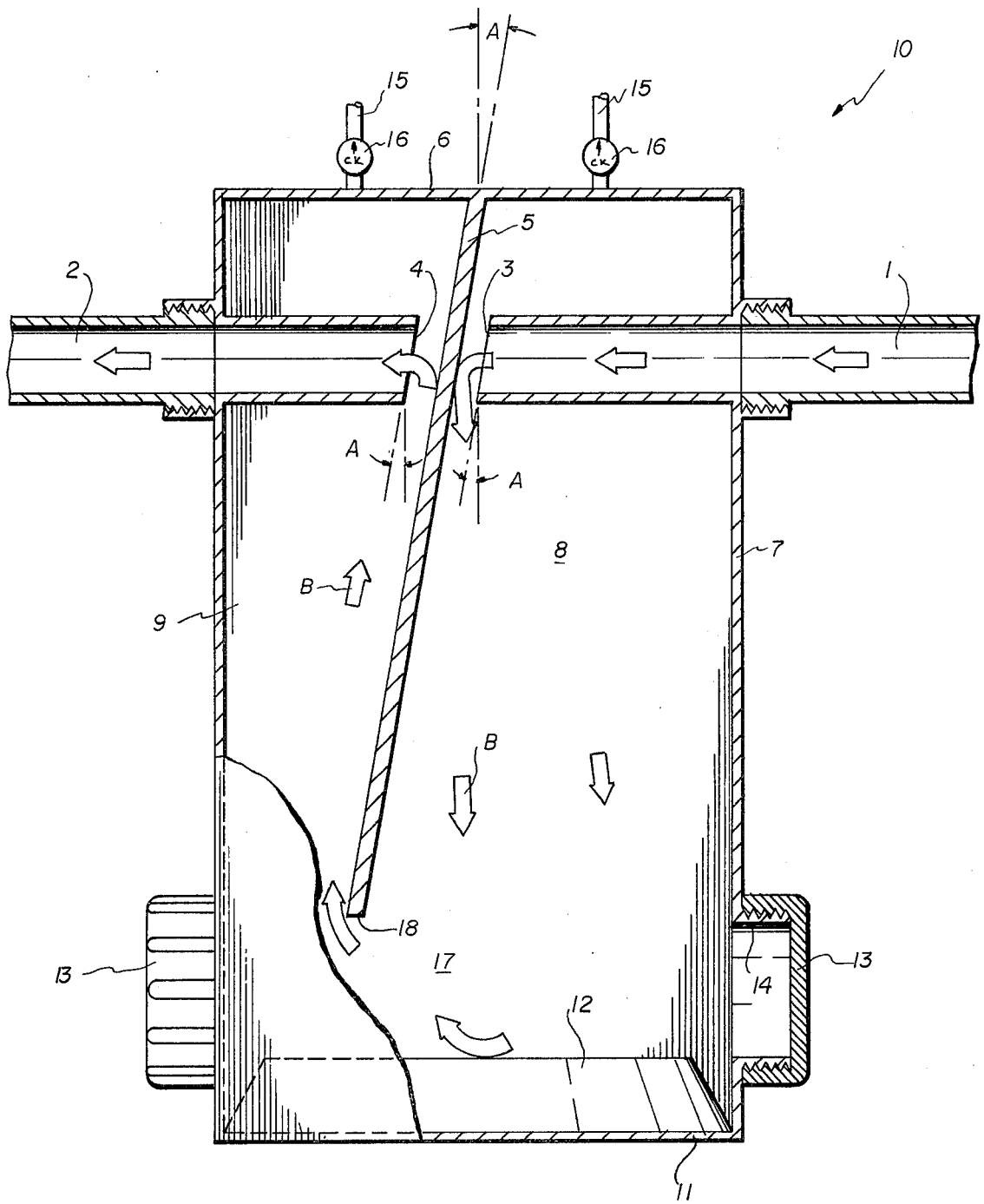

UNIVERSAL MAGNETIC ANGLED STRAINER

BACKGROUND OF THE INVENTION

The following invention relates generally to devices which separate magnetic particles from a fluid stream.

It is well known that the presence of magnetic properties coursing through fluids can have deleterious effects on associated equipment placed in line, down stream from the fluid flow network. For example, many internal combustion engines rely on metal to metal relative motion having an interposed oil film therebetween, and the presence of metallic chips or the like can seriously scar and therefore reduce the life of these engines. In other areas such as, the processing of minerals in slurries or the like, the removal of these minerals or magnetic particles can be regarded as one stage in the processing of the slurry. In situations such as this, it would be beneficial to have a device which can be installed in line so that maximum flow rate of the slurry can be achieved.

In other areas, it is desirable to have the magnetic particles removed from a fluid, in many other forms of fluid purification systems where the presence of the magnetic particles is unwanted, such as in water lines. Other equipment, such as engine radiators, all heat exchanges, hot water heaters, fire engine pumping mechanisms all require that the fluid passing therethrough is substantially contaminant free for the obvious benefits. In fact, wherever the life of a water pump or other liquid pump is involved, the removal of these deposits or particles is of tantamount importance.

The following U.S. Pat. Nos. reflect the state of the art of which applicant is aware, insofar as these patents appear germane to the patent process:

643,237, Blume; 4,265,755, Zimmerman; 4,299,700, Sanderson; 2,699,871 Stem; 2,781,128, Stem; 4,116,829, Clark et al.; 4,299,701, Garrett et al.; 4,306,970, Tanaka et al.; 4,212,407, Lydon; 4,244,822, Slavens.

Thus, Clark et al. teaches the use of a known prior art technique of magnetic material separation for removal from a fluid in which they travel, in which fluid entering a lower portion of a sealed chamber is required to pass through a matrix which includes a plurality of ferromagnetic filaments arranged substantially parallel to one another and to the general direction of flow of fluid, a high intensity magnetic field is applied substantially perpendicular to the flow of the fluid to the matrix thus formed, and a removal means for removing magnetizable particles attached to the matrix within the separating chamber. An outlet 18 is provided at a higher horizontal elevation, so that the treated fluid may leave therethrough. In this apparatus, regeneration is required by back flushing the apparatus at regular intervals.

Tanaka et al. teaches the use of another prior art technique wherein a magnetic separating device entrains particles normally disposed in coolants, lubricants, or working fluids, and these contaminants are removed by the presence and application of magnetic fields. Liquid enters from a top portion of a housing and is separated in a lower portion by means of the magnetic particles being influenced through an associated field.

Similarly, the patents to Stem teach prior art techniques involving the use of magnetic separation in which a magnetic receiving area is provided with an access door for removal of the entrained particles from the flow path as a function of time.

The remaining citations show the state of the art further.

By way of contrast, the instant invention as defined in the application pertains to and specificies a device for separating magnetic particles from a fluid stream or the like wherein an enclosure having inlet and outlet conduit means in operative communication with the enclosure allows a throughput of fluid therewithin, and a baffle means is interposed between the inlet and the outlet in such a manner that the baffle means defines the enclosure into plural distinct areas: an inlet area, a lower separation area, and an outlet area. More specifically, the lower separation area is provided with a magnetic device so that fluid passing thereby will be influenced in such a manner that magnetic particles will not traverse therebeyond, and the fluid, once removed of magnetic impurities will be allowed to translate to the third or outlet area and thence to an outlet pipe. Portal means are provided to allow intimate access with the magnetic separation device, so that in use and operation the magnetic attractor device can be cleaned at regular intervals by the removal of magnetic particles thereon. In a preferred form, the baffle interposed between the inlet and the outlet is disposed in parallel relationship to the orifices defining each inlet and outlet respectively, and angled within the enclosure so that the device is asymmetrical and the transition between the inlet area and separation area has a much larger volume than the transition between the separation area and the outlet area as will be defined.

SUMMARY AND OBJECTS OF THE INVENTION

Accordingly, this invention has an objective an improved magnetic separation device when contrasted with prior art technology.

It is yet a further object of this invention to provide a device of the character described above which is substantially maintenance free, and extremely durable in construction.

It is yet a further object of this invention to provide a device of the character described above which is extremely reliable in use, and lends itself to mass production techniques.

It is still yet a further object of this invention to provide a device of the character described above which as a function does not have reduced flow throughput due to clogging or the like.

These and other objects will be made manifest when considering the following detailed specification when taken in conjunction with the appended drawing figures.

BRIEF DESCRIPTION OF THE DRAWING FIGURES

FIG. 1 is a side view partially in section of the apparatus according to the instant invention.

BRIEF DESCRIPTION OF THE PREFERRED EMBODIMENT

Referring to the drawing now, wherein like reference numerals refer to like parts throughout the drawing figure, reference numeral 10 is directed to the device for separating magnetic particles according to the present invention.

More particularly, an enclosure is provided having a top wall 6, a plurality of side walls 7, and a bottom wall 11 so as to define an enclosure interior, preferably of substantially cylindrical or rectangular configuration. One side wall of the enclosure has an inlet conduit 1 and a diametrically opposed side wall has an outlet 2 with inlet and outlet orifices 3, 4 respectively communicating with the interior of the enclosure. The orifices are separated from each other by means of a downwardly extending angulated baffle 5 which as shown in the drawing figure is angled from a vertical plane by an angle A. In a preferred form of the invention, angle A can range from 0° to 75°, the preferred angle setting being 30°. Further as shown, the outlets 3, 4 have an angulation relative to the baffle 5 such that the baffle and each outlet are substantially parallel, therefore each conduit is truncated to provide a similar angle A as shown in the drawing. As depicted, the baffle 5 is disposed transverse to the direction of flow of the inlet and outlet conduits, and is coextensive between diametrically opposed walls so as to define a partition and cause incoming fluid to follow the course of the arrows B into a first area 8 downwardly to a second or lowermost area 17 and thereafter upwardly to the outlet 4 in the third area bearing the reference numeral 9. Thus, it is clear that the first area 8 has comparatively greater volume than the third area 9, the second or lowermost area 17 defined by the bottom edge 18 of the baffle 5 so that fluid passing downwardly must to a certain degree traverse past a magnetic means 12 depicted schematically as residing on the bottom 11 of the device 10. As shown, the magnetic attractive device 12 is of substantially frustoconical form.

Periodically, maintenance is desired in removing entrained particles from the magnetic separator 12, and for this purpose access portals are provided. More specifically, a threaded opening 14 and an associated threaded cap 13 at the bottommost portion of the device 10 allow the appropriate manipulation thereof so that access to the lowermost portion 17 of the device can be effected. In some forms, this maintenance would require simple replacement of the magnetic device 12 or merely its cleansing of the magnetic particles entrained. As shown also, it should be clear that by the virtue of the angulation of the baffle 5 and the natural restriction that occurs in its being canted towards the third portion 9, fluid tends to stay in the bottommost portion and have a great amount of exposure time to the magnet, an important attribute.

The top wall 6 of the device includes first and second inlet and outlet check valves respectively to allow the migration of gas buildup should the device be used to separate magnetic particles from liquids. More specifically, check valve 16 communicate with conduits 15 to allow the egress of built-up vapor pressures within certain limits determined by the check valve 16.

Having thus described the preferred embodiment of the invention, it should be understood that numerous structural modifications and adaptations may be resorted to without departing from the spirit of the invention.

What is claimed is:

1. A device for separating magnetic particles from a fluid stream or the like comprising, in combination:
   an enclosure,
   an inlet and an outlet conduit means communicating with said enclosure,
   a baffle means with said enclosure interposed between said outlet and inlet conduit means and angulated from vertical,
   said baffle means dividing said enclosure into plural areas: an inlet area, a lower separation area, and an outlet area,
   said separation area including a magnetic source to remove the magnetic particles from the fluid stream wherein open free ends of said inlet and outlet conduit means are within said enclosure and mouths of said free ends are disposed in parallel relationship with said interposed baffle.

2. The device of claim 1 wherein said inlet and outlet conduit means are substantially coaxial, and said baffle interrupts the through-flow therebetween.

3. The device of claim 2 wherein both said inlet and outlet conduit means are each formed from first inner and second outer portions, said outer portions threaded to said enclosure exterior.

4. The device of claim 3 wherein said interposed baffle is angulated at an angle of 30° relative to a vertical plane, and canted towards said outlet.

5. The device of claim 4 wherein said baffle defines plural said areas, said inlet area having a greater volume, said lower separation area proximate to said magnetic means, and a restricted said outlet area proximate to said outlet conduit means, whereby fluid passing therethrough contacts intimately said magnetic means.

6. The device of claim 5 wherein said magnetic means is formed from a truncated frustoconical device, and an access port having a threaded cap is provided proximate to said magnetic means above said magnetic means and through said enclosure for access thereto.

7. The device of claim 6 wherein said device is provided with venting means on a top face of said enclosure, to allow the egress of vapor buildup.

8. The device of claim 7 wherein said venting means includes a check valve adjustable to be actuated by different vapr pressures.

9. The device of claim 8 wherein said enclosure is substantially rectangular in configuration.

* * * * *